United States Patent [19]
Skarlupka

[11] Patent Number: 5,103,968
[45] Date of Patent: Apr. 14, 1992

[54] PARALLEL CENTERLINE CHAIN DRIVE

[76] Inventor: Joseph H. Skarlupka, N3671 Buettner Rd., White Lake, Wis. 54491

[21] Appl. No.: 641,425

[22] Filed: Jan. 14, 1991

[51] Int. Cl.[5] ............................................. B65G 23/14
[52] U.S. Cl. .................................... 198/833; 198/838; 198/845
[58] Field of Search ............... 198/365, 833, 838, 845, 198/683–687

[56] References Cited

U.S. PATENT DOCUMENTS

| | | |
|---|---|---|
| 2,309,587 | 1/1943 | Hassler ............................ 198/833 X |
| 2,476,497 | 7/1949 | Landahl ........................... 198/833 X |
| 2,491,950 | 12/1949 | Bridge . | 
| 2,609,086 | 9/1952 | McBride et al. ................. 198/833 X |
| 2,798,592 | 7/1957 | Uhrich et al. ......................... 198/833 |
| 2,868,356 | 1/1959 | Haaff .................................... 198/833 |
| 3,637,067 | 1/1972 | Wright ............................ 198/833 X |
| 4,031,998 | 6/1977 | Suzuki et al. . |
| 4,088,220 | 5/1978 | Jacksch et al. . |
| 4,185,733 | 1/1980 | Heikinheimo . |
| 4,776,453 | 10/1988 | Miller . |
| 4,795,026 | 1/1989 | Nevo-Hacohen . |
| 4,856,642 | 8/1989 | Nicholson et al. . |
| 4,934,515 | 6/1990 | Linden . |

OTHER PUBLICATIONS

Electrocom Automation sorter transport literature.

*Primary Examiner*—D. Glenn Dayoan
*Attorney, Agent, or Firm*—Lathrop & Clark

[57] ABSTRACT

A drive assembly has two parallel roller link drive chains which are driven by sprocket drives. The drive chains are transversely connected at spaced intervals by a dog support which has a planar base and two walls which extend upwardly from the base. The rollers of two parallel drive chain links are rotatively mounted to the walls and a plastic drive dog is attached to the support base. The drive dog has two projecting members and a base which define a depression which is radiused to accept a tow chain roller. The depression is spaced from the support base such that the horizontal rotational axis of the engaged tow chain roller and the horizontal rotational axes of the chain rollers are in the same plane. Stabilizing rollers are mounted to the support walls coaxially with the drive rollers and are supported in a formed track section. The dog support carries the shaped dog into engagement with the rollers of the tow chain.

16 Claims, 5 Drawing Sheets

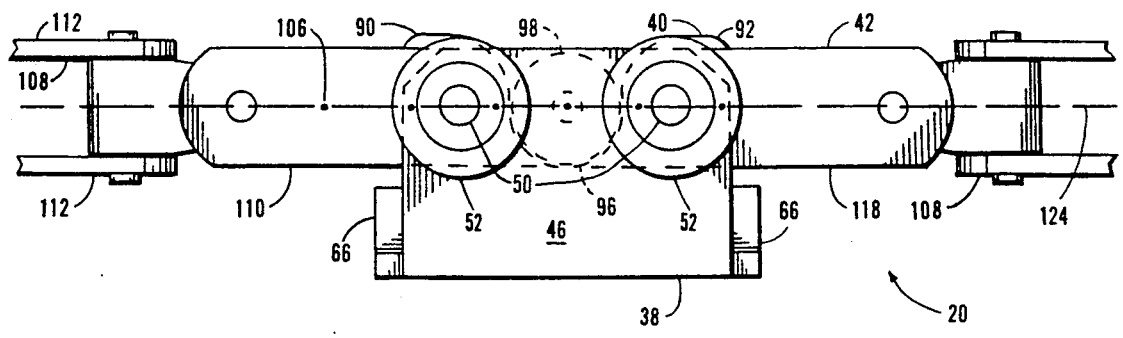
FIG. 5
FIG. 6
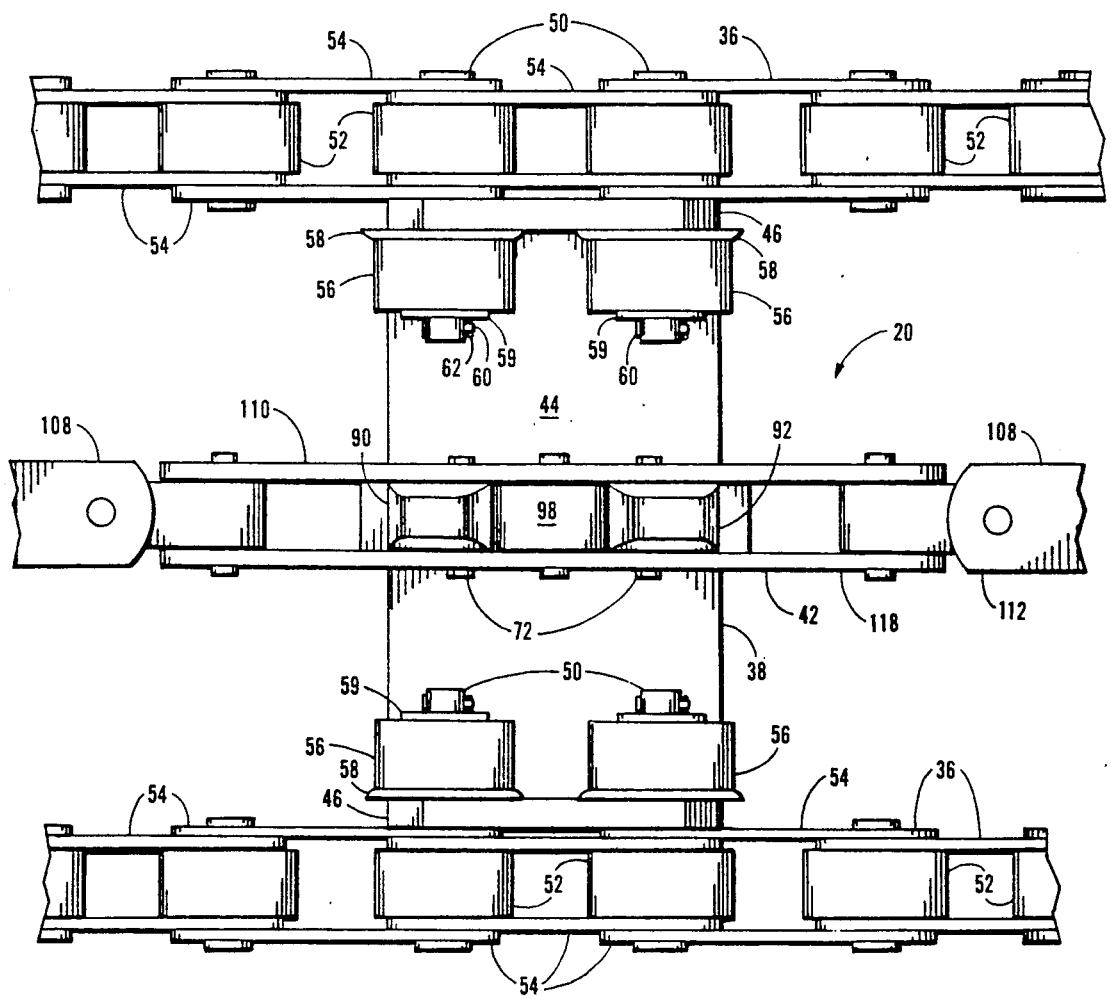

PARALLEL CENTERLINE CHAIN DRIVE

FIELD OF THE INVENTION

This invention relates generally to chain drive apparatuses, and particularly to continuous chain drives which drive an independent chain.

BACKGROUND OF THE INVENTION

When it is desired to move an article or piece of machinery from one location to another, it is well known to connect the item to be moved to a continuous looped chain formed of rigid links which engages with the sprocket teeth of a rotating drive sprocket wheel. Such a drive chain will only be useful in situations where the item to be moved follows a looped path within a single plane. Furthermore, articles integrally connected to the drive chain may not be removed from the drive apparatus.

Articles which must move along a path with multiple curvatures and changes in elevation may be conveniently handled by a bi-planar tow chain. This chain is formed of multiple rigid lengths which are joined to permit rotation about two axes. A tilt-tray assembly or other carriage may be fixed to the tow chain together with a number of guide wheels which stabilize the carriage in a fixed track.

In a conventional caterpillar drive assembly the sprocket and chain apparatus engages with the tow chain to advance the chain along a predetermined path. A number of drive chain and sprocket wheel assemblies may be placed along the tow chain path where the path is substantially linear to drive the tow chain around curves and to different elevations.

One known method of engaging the drive chain with the tow chain employs downwardly depending nylon dogs spaced along the tow chain and U-shaped aluminum dogs affixed at intervals to the drive chain which engage the tow chain dogs and advance the tow chain. This type of apparatus results in sharp shocks to the tow chain each time a depending dog is grasped by the drive chain. Repeated shocks result in a jerky motion of the tow chain and rapid wear to the mechanical elements of the system which must sustain repeated severe shocks. These shocks and the wear to the system is particularly pronounced at high speeds such as would be desirable in a tilt-tray sortation system.

What is needed is a chain drive which smoothly engages with a tow chain to effectively transmit drive power and which may operate at high speeds to provide even motion of the driven chain with a minimum of wear to the system parts.

SUMMARY OF THE INVENTION

The chain drive apparatus of this invention is adapted for driving a bi-planar tow chain having a roller which is rotatable about a horizontal axis. The apparatus has a drive dog with a left side face, a right side face, a front face and a rear face and the drive dog has a base with two projecting members which extend upwardly from the base. The projecting members are spaced from one another such that portions of the projecting members and the base define a depression which is adapted to engage and hold a tow chain roller. A dog support has a base and two walls which project upwardly from the base and are spaced on opposite sides of the base. The base of the dog is rigidly attached to the dog support between the walls. The walls have portions defining through-holes which are spaced from the base. The attached dog depression is also spaced above the support base such that the horizontal axis of an engaged tow chain roller will be in approximately the same plane as the axes of the wall through-holes. A drive chain is mounted to each wall of the dog support to align the axes of at least two of the chain rollers with the wall through-holes such that the axes of the drive chain rollers lie in approximately the same plane as the axis of an engaged tow chain roller.

It is an object of the present invention to provide a chain drive apparatus which accurately drives a bi-planar tow chain without significant surging.

It is another object of the present invention to provide a chain drive apparatus which operates at reduced noise levels.

It is a still further object of the present invention to provide a chain drive apparatus wherein the force of the driving chain is applied in line with the driven tow chain.

It is an additional object of the present invention to provide a chain drive apparatus which smoothly and evenly engages with and drives a tow chain.

It is also an object of the present invention to provide a chain drive apparatus which is subjected to a reduced rate of wear.

It is a further object of the present invention to provide a chain drive apparatus which efficiently transmits the motion of a rotary sprocket wheel to the linear motion of the driven chain.

Further objects, features and advantages of the invention will be apparent from the following detailed description when taken in conjunction with the accompanying drawings.

BRIEF DESCRIPTION OF THE DRAWINGS

FIG. 5 is a side elevational view of the tow chain and dog support of FIG. 1 with the drive chain removed to schematically show the aligned axes of the drive and tow chain rollers.

FIG. 6 is a fragmentary top plan view of the chain drive of FIG. 1.

DESCRIPTION OF THE PREFERRED EMBODIMENT

Figure 1:
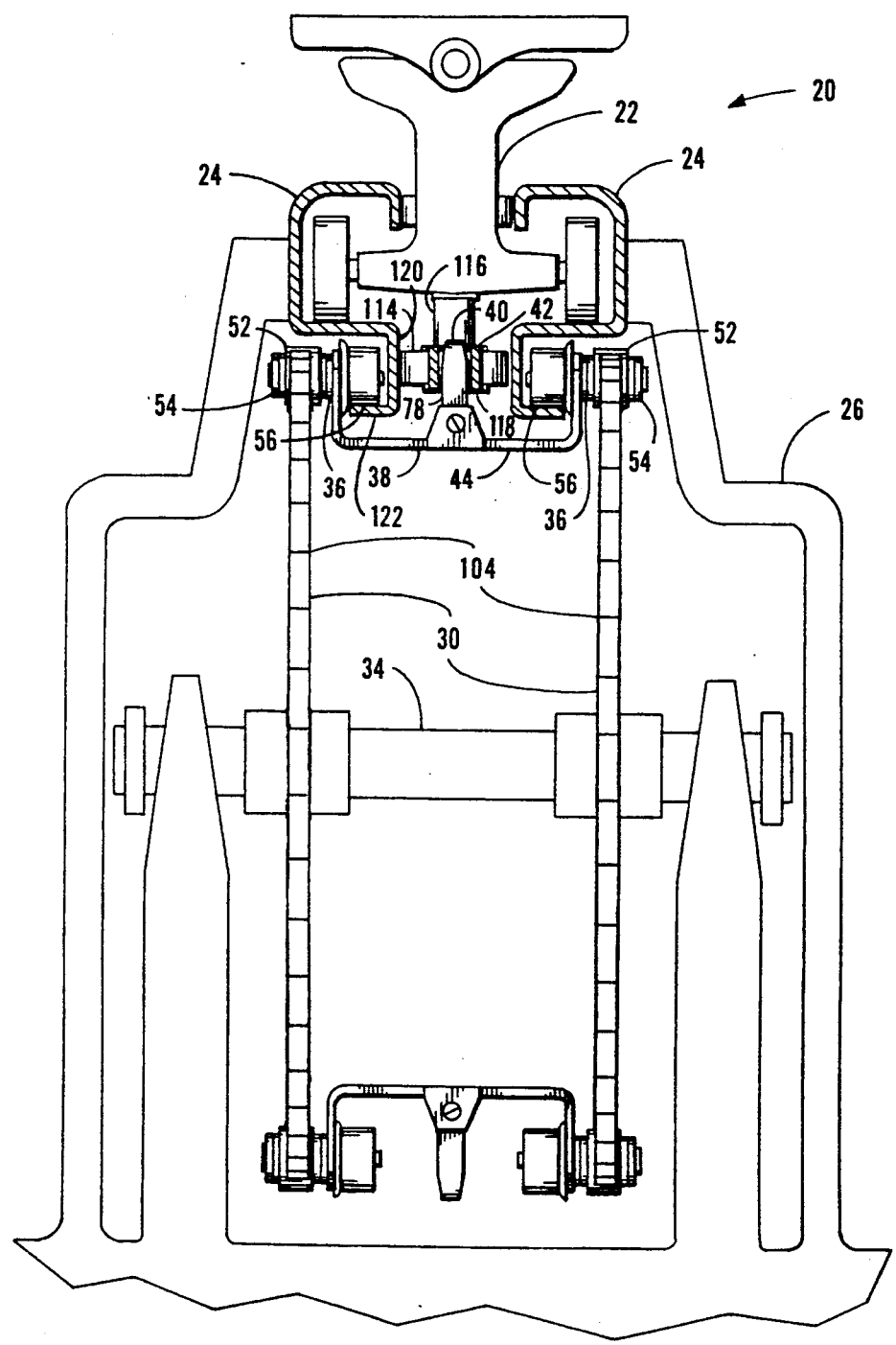
FIG. 1 is a cross-sectional view of the chain drive apparatus of the present invention.
Figure 2:
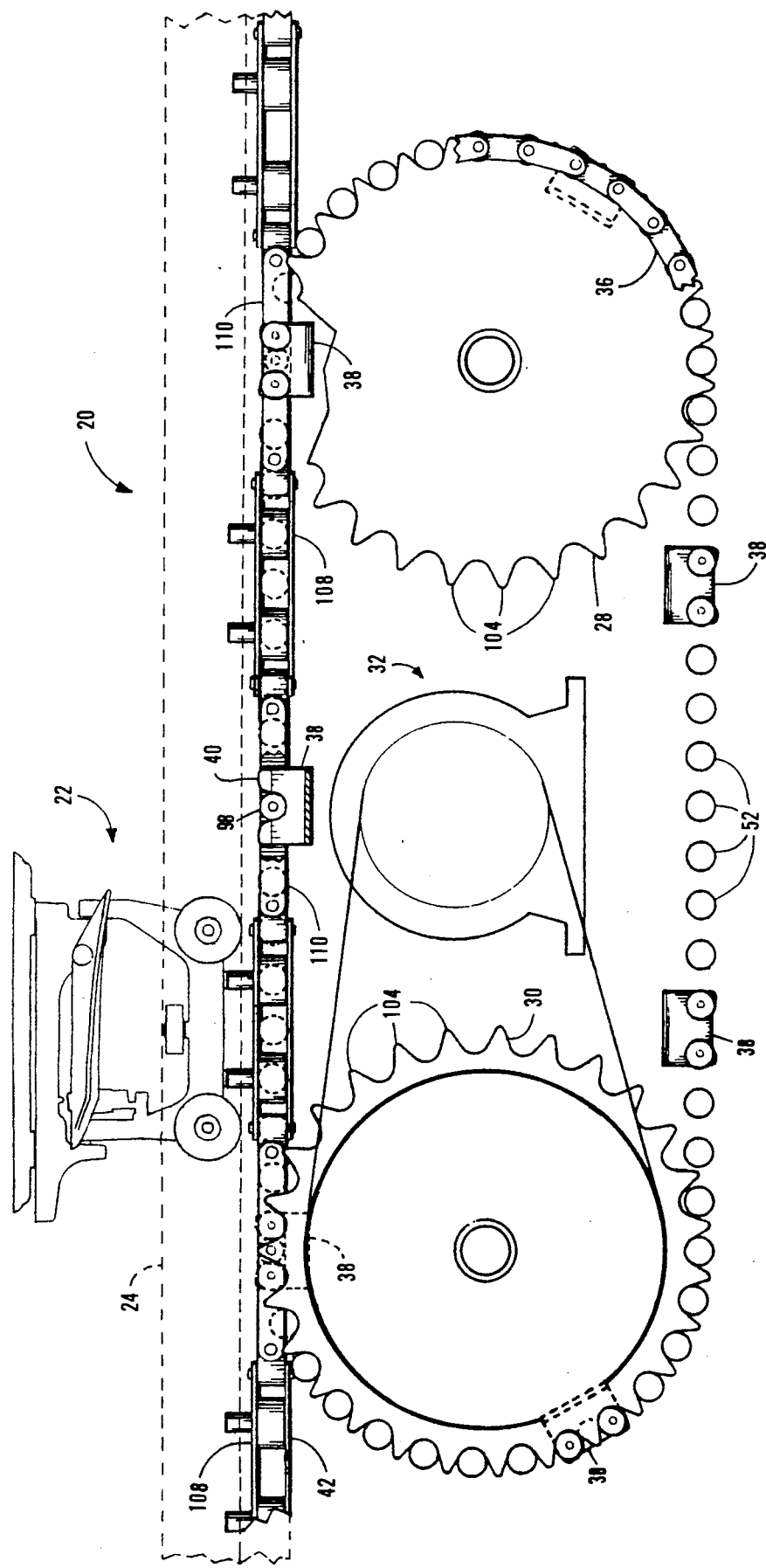
FIG. 2 is a partially schematic side elevational view of the chain drive apparatus of FIG. 1.

Referring more particularly to FIGS. 1-6 wherein like numbers refer to similar parts, a chain drive apparatus 20 is shown in FIGS. 1 and 2. Although the chain drive apparatus 20 has application in numerous material handling and conveying applications, it is illustrated in conjunction with a conventional tilt-tray sorter which has a wheeled tilt-tray carriage 22. The carriage 22 travels within a formed track section 24. The track 24 is supported by a frame 26 to which are mounted four conventional rotatable sprockets 28, 30. The driving sprockets 30 are turned by a conventional means such as a belt and pulley system 32, shown schematically in FIG. 2 and, for clarity, omitted from the other views.

As best shown in FIG. 1, the driving sprockets 30 are mounted on a common axle 34. Each driving sprocket is forwardly spaced from a freewheeling sprocket 28. A drive chain 36 formed of a continuous loop of conventional roller chain encircles each pair of driving and freewheeling sprockets 28, 30. The parallel drive chains 36 are linked at evenly spaced intervals by dog supports 38. The dog supports 38 carry an upstanding dog 40 which engages with a bi-planar tow chain 42 to which the carriage 22 is attached. Although the tow chain 42 is also a continuous loop it extends beyond the chain drive apparatus 20 in a formed track section which may direct the tow chain 42 along a path of compound curves with variations in elevation.

Because the drive chains 36 and tow chain 42 will commonly be operated at a speed of 360–400 feet per minute, the chain drive apparatus is designed to facilitate a smooth engagement of the drive chains 36 with the tow chain 42 and a direct application of force to the tow chain 42 over the course of its travel through the chain drive apparatus 20.

The tow chain 42 is engaged by the transversely connected drive chains 36 through evenly spaced dog supports 38 and dogs 40.

Figure 3:
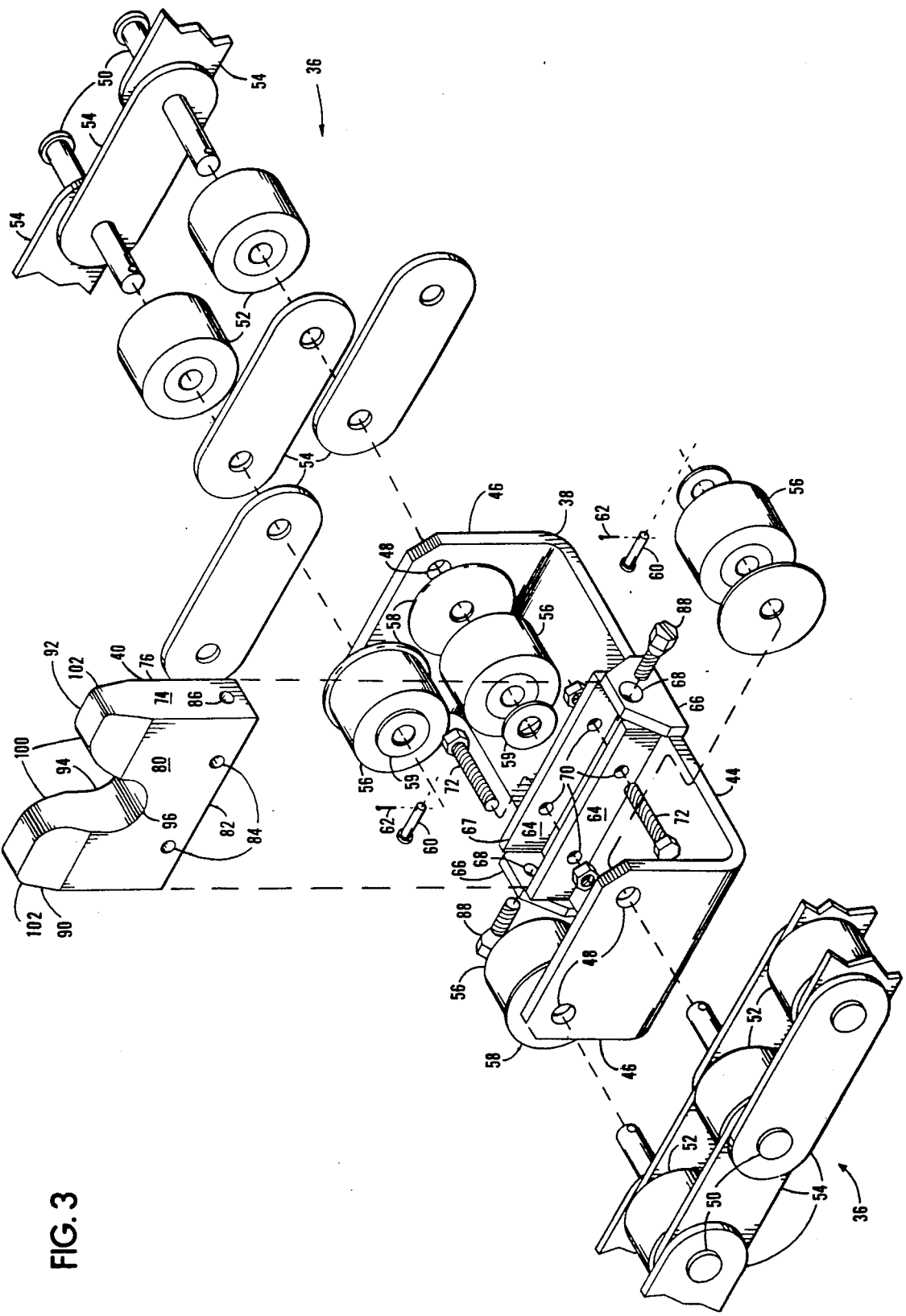
FIG. 3 is an exploded isometric view of a drive dog, drive dog support, and drive chains of the apparatus of FIG. 1.

The dog support 38, best shown in FIG. 3, is a U-shaped steel plate approximately ⅜ inch thick which has a planar base 44 and upright walls 46 spaced on opposite sides of the base. Each wall 46 has two through-holes 48 which receive drive chain pins 50. Each drive chain 36 is formed of a series of 1¾" urethane covered chain rollers 52 which are equally spaced by metal chain links 54. The dog supports 38 are attached to the drive chains 36 by over-length drive chain pins 50 inserted in the through-holes 48 in the walls 46. Stabilizing rollers 56 of the same diameter as the chain rollers 52 are mounted on the drive chain pins 50 on the interior sides of the walls 46 and are spaced by brass washers 58, 59 and are held in place with pins 60 and cotter pins 62. The drive chain pins 50 define horizontal rotational axes about which the drive chain rollers 52 and the co-axially mounted stabilizing rollers 56 rotate.

Rectangular plates 64 and plate end stops 66 are attached in the center of the dog support base 44, such as by welding, to form a slot 67 which receives the dog 40. The stops 66 have countersunk holes 68 and the rectangular plates 64 have through-holes 70 which are adapted to receive fasteners 72.

The dog 40 is formed of nylon and has a rear face 74, a right side face 76, a front face 78 and a left side face 80. The dog 40 has a base 82 which is rectangular in plan and which is slightly larger than the slot 67 formed by the plates 64, 66. The dog 40 is press-fit into the slot 67 so that the faces 74, 76, 78, 80 of the base 82 are compressibly engaged with the plates 64, 66. In addition, the dog base 82 has through-holes 84 which align with the through-holes 70 in the rectangular plates 64, and blind holes 86 which align with the countersunk holes 68 in the plate stops 66 into which the fasteners 88 are inserted. The dog 40 is thus snuggly and securely attached to the dog support 38 to avoid any frontward to rearward slop in the attachment of the dog 40 to the support 38 which would detract from the accuracy of the drive motion as well as the smoothness.

Two projecting members 90, 92 extend upwardly from the dog base 82. The projecting members 90, 92 are spaced from one another along the line of travel of the drive chains 36. The projecting members 90, 92 are spaced from one another such that portions of the projecting members and the base 82 define a depression 94. The bottom of the depression has a radius 96 which is slightly larger—approximately 1/64"—than the radius of the tow chain roller 98 with which the dog 40 engages. The depression 94 is spaced from the base 44 of the dog support 38 such that the center of the radius 96 is spaced the same distance from the base 44 as are the centers of the through-holes 48. Thus, as best shown in FIG. 5, the horizontal axis of the tow chain roller 98, defined by the tow chain roller pin 99, is in the same plane as the axes of the chain rollers 52 which are pinned to the dog support walls 46.

The left side face 80 and the right side face 76 of the dog 40 are tapered towards the top of the dog. Thus, the projecting members 90, 92 have tapered side surfaces which assist in centering the tow chain 42 over the dog 40. The projecting members 90, 92 have radiused portions 100 on the side adjacent the deprsssion 94 to permit the tow chain roller 98 to enter and exit the depression 94. The projecting members 90, 92 have smaller radiused portions 102 on the exterior surfaces of the dog 40 to further assist the entry and exit of the tow chain roller 98.

Figure 4:
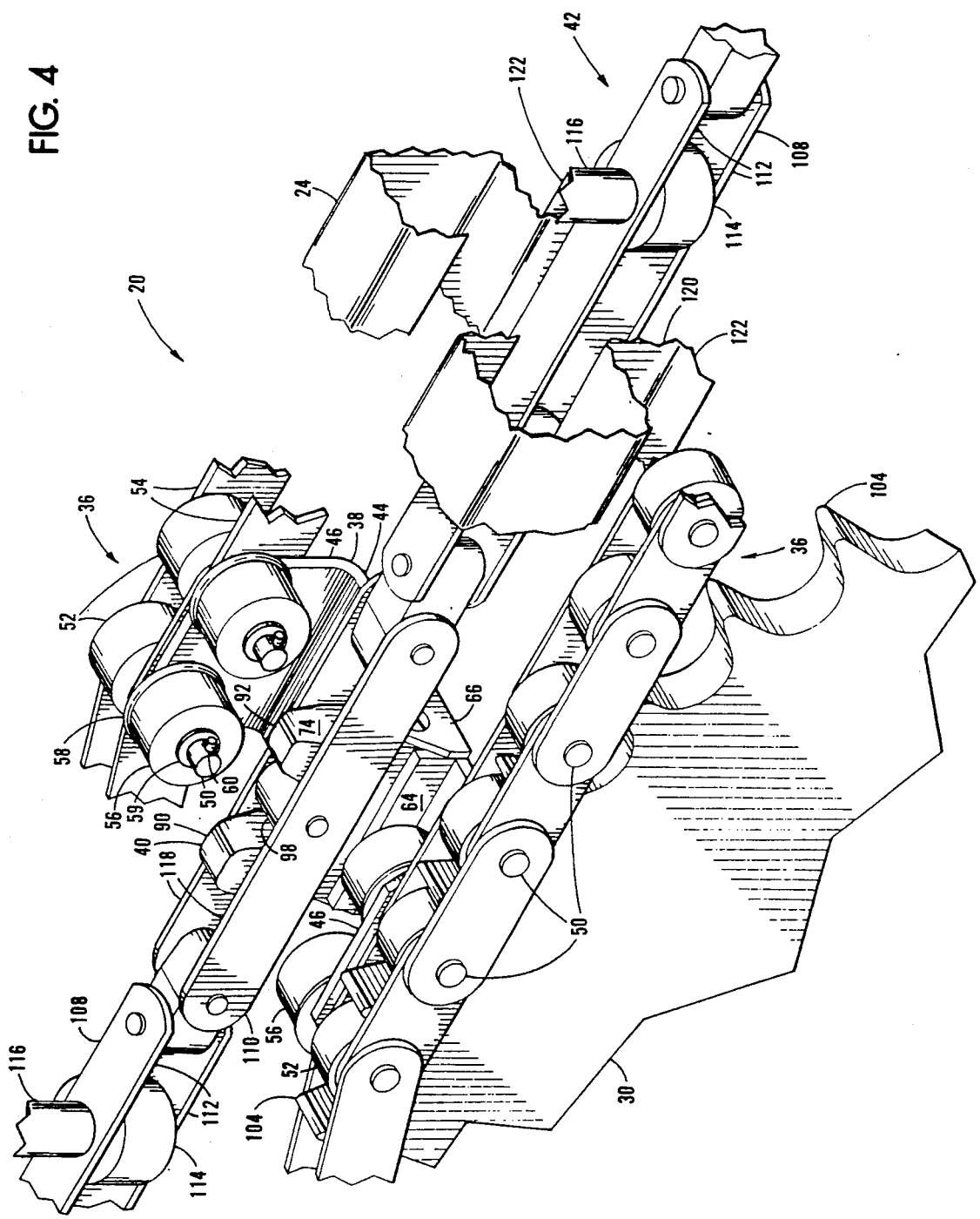
FIG. 4 is an isometric view of a tow chain being engaged by the drive dog and the drive chains being engaged by the sprocket wheels of the apparatus of FIG. 1.

The operation of the chain drive apparatus 20 is best shown in FIG. 4 in which, for clarity, portions of the formed track section 24 and the right driving sprocket 30 have been omitted. When the chain drive apparatus 20 is activated, the sprocket teeth 104 of the two driving sprockets 30 engage the chain rollers 52 in the two parallel drive chains 36. The drive chains 36, which are of three inch pitch, are connected by dog supports 38 every 27 inches. As the driving sprockets 30 and freewheeling sprockets 28 rotate, the drive chains 36 are placed in tension and the dog supports 38 are advanced linearly. The portions of each drive chain 36 under tension define an imaginary centerline 106 which runs through the horizontal axes of the chain rollers 52 and is shown as a series of dots in FIG. 5.

Preferably the chain drive 20 is sufficiently long enough that at least two drive dogs 40 are engaged with the tow chain 42 at all times. The drive dog supports 38 are spaced along the drive chains 36 to coincide with the spacing of the tow chain rollers 98.

The tow chain 42, best shown in FIGS. 5 and 6, consists of alternating carriage attachment segments 108 and driven segments 110. The carriage attachment segments 108 have two carriage links 112 to which are attached two lateral stabilizing rollers 114 which rotate about a vertical axis. The vertical axes coincide with carriage attachment bosses 116 which are connected to the tilt-tray carriage 22. The lateral stabilizing rollers 114 are spaced six inches from one another. The driven segments 110 have two links 118 with a central tow chain roller 98 rotatably connected on a pin 99 to the links 118 about a horizontal axis. The length of the driven segments 110 may be selected in three inch increments to suit a particular article or carriage to be pulled by the tow chain 42, for example, 12 inches.

As best shown in FIG. 2, as the drive chains 36 are advanced into engagement with the tow chain 42, a dog support 38 carrying a dog 40 moves up from beneath the tow chain 42. A tow chain roller 98 engages against the front projecting member 90 of the dog 40, rolls over the outside radius portion 102 and down the inside radius portion 100 where it is snuggly engaged within the depression 94. The tapered projecting members 90, 92 assist in centering the tow chain roller 98 over the depression 94 and in directing the links 118 of the driven segment 110 into position on either side of the dog 40.

As the tow chain 42 advances through the chain drive apparatus 20, the lateral stabilizing rollers 114, as best shown in FIGS. 1 and 4, center the tow chain 42 between vertical sections 120 of the formed track section 24. The four stabilizing rollers 56 on each dog support 38 are carried on horizontal sections 122 of the formed track section 24 which extend from the vertical sections 120.

The links of the bi-planar tow chain 42 moving through the chain drive apparatus 20 define an imaginary tow chain centerline 124, shown as a series of dashes in FIG. 5.

When the tow chain 42 leaves the chain drive apparatus 20, as shown in FIGS. 1 and 4, the drive dog 40 is carried by the drive chains 36 around the driving sprockets 30 and the tow chain roller 98 rolls up the rear projecting member 92 over the radiused portion 100 and out of engagement with the drive chains 36.

As shown in FIG. 5, the centerlines 106, 124 of the drive chains 36 and the tow chain 42 are aligned in parallel relation within the same plane as the tow chain 42 moves through the chain drive apparatus 20. The double drive chains 36 give stability to the dog supports 38, and the alignment of the dogs 40 with the tow chain rollers 98 ensures that a pushing force is applied directly through the centerline 106 of the tow chain 42. By avoiding an extended moment arm between the drive chains 36 and the driven tow chain 42, surging in the tow chain 42 is minimized. Furthermore, because the shock to the chains 36, 42 is reduced, the wear life of the parts in the chain drive apparatus 20 is extended.

The engagement of the tow chain roller 98 in the same plane as the axes of the drive chain rollers 52 achieves the desirable result of eliminating resultant moments from the force applied by the drive chains 36 which would tend to rotate the support 38 about the tow chain roller 98. Because the drive chain and the tow chain centerlines 106, 124 lie in a common plane, the force transmitted by the drive chains 36 is directed towards pushing the tow chain roller 98 solely along the path of movement. This alignment of driving and driven chain and the solely horizontal motion of the combined chains that results, reduces drag on the stabilizing rollers 56, and generally results in a lower rate of wear on the drive apparatus parts.

It should be noted that the chain drive apparatus may be equally effective in driving bi-planar tow chains which are connected to buckets, tables or other conveying apparatus. The drive dog may alternatively be formed of ultra-high molecular weight polyethylene or other material which is not excessively brittle.

It should further be noted that chain rollers and stabilizing rollers of varying dimensions may be employed to suit the needs of a particular application.

It is understood that the invention is not confined to the particular construction and arrangement of parts herein illustrated and described, but embraces such modified forms thereof as come within the scope of the following claims.

I claim:

1. A drive assembly for driving a bi-planar tow chain having a roller rotatable about a horizontal axis; comprising:
    a) a drive dog having a left side face, a right side face, a front face, and a rear face, wherein the drive dog has a base and two projecting members extending upwardly from the base, the projecting members being spaced from one another such that portions of the projecting members and the base define a depression adapted to engage and hold the tow chain roller;
    b) a dog support having a base and two walls projecting upwardly from the support base and spaced on opposite sides of the support base, wherein the base of the dog is rigidly attached to the dog support between the walls; and
    c) two drive chains having a plurality of rollers rotatable about horizontal axes, wherein a drive chain is mounted to each wall of the dog support such that the axes of the mounted drive chain rollers lie in approximately the same plane as the axis of an engaged tow chain roller.

2. The drive assembly of claim 1 wherein the projecting members of the drive dog are tapered to direct a tow chain into engagement with the drive dog.

3. The drive assembly of claim 1 wherein a one of said projecting members has portions defining a curved surface at the front face of the dog to direct a tow chain roller into engagement with the depression.

4. The drive assembly of claim 1 wherein the dog support has portions which project upwardly from the base to define a slot and the dog is compressibly engaged within the slot.

5. The drive assembly of claim 4 wherein the drive dog base is rectangular in plan and has portions defining a through-hole running from the left face to the right face, and the slot-defining portions of the dog support have through-holes which align with the through-hole in the dog base and further comprising a fastener inserted in the aligned through-holes.

6. The drive assembly of claim 1 wherein the dog support walls have portions defining through-holes spaced from the support base and the attached dog depression is spaced from the support base such that the horizontal axis of an engaged tow chain roller will be in approximately the same plane as the axes of the wall through-holes, and the drive chains are mounted to the walls such that at least two rollers are rotatably mounted on pins which are inserted in the wall through-holes.

7. The drive assembly of claim 1 further comprising a stabilizing roller rotatably mounted about a horizontal axis to each dog support wall and adapted to bear against and rotate over a supporting track.

8. The drive assembly of claim 7 wherein the stabilizing rollers are mounted co-axially with the drive chain rollers.

9. A drive assembly for driving a bi-planar tow chain having a roller rotatable about a horizontal axis; comprising:
    a) a drive dog having a left side face, a right side face, a front face, and a rear face, wherein the drive dog has a base and two projecting members extending upwardly from the base, the projecting members being spaced from one another such that portions of the projecting members and the bases define a depression adapted to engage and hold the tow chain roller;
    b) a dog support having a base and two walls projecting upwardly from the support base and spaced on opposite sides of the support base, wherein the base of the dog is rigidly attached to the dog support between the walls; and c) two drive chains having a plurality of connected chain links, and each chain is adapted for engagement with and movement by a rotating sprocket, wherein at least one link of a drive chain is mounted to each wall of the dog support such that rotation of the engaged sprockets will cause the advancement of the tow chain.

10. The drive assembly of claim 9 wherein the projecting members of the drive dog are tapered to direct a tow chain into engagement with the drive dog.

11. The drive assembly of claim 9 wherein a one of said projecting members has portions defining a curved surface at the front face of the dog to direct a tow chain roller into engagement with the depression.

12. The drive assembly of claim 9 wherein the dog support has portions which project upwardly from the base to define a slot and the dog is compressibly engaged within the slot.

13. The drive assembly of claim 12 wherein the drive dog base is rectangular in plan and has portions defining a through-hole running from the left face to the right face, and the slot-defining portions of the dog support have through-holes which align with the through-hole in the dog base and further comprising a fastener inserted in the aligned through-holes.

14. The drive assembly of claim 9 wherein the drive chains have a plurality of chain rollers rotatable about horizontal axes, the dog support walls have portions defining through-holes spaced from the support base and the attached dog depression is spaced from the support base such that the horizontal axis of an engaged tow chain roller will be in approximately the same plane as the axes of the wall through-holes, and the drive chains are mounted to the walls such that at least two rollers are rotatably mounted on pins which are inserted in the wall through-holes.

15. The drive assembly of claim 9 further comprising a stabilizing roller rotatably mounted about a horizontal axis to each dog support wall and adapted to bear against and rotate over a supporting track.

16. The drive assembly of claim 15 wherein the stabilizing rollers are mounted co-axially with the drive chain rollers.

* * * * *